United States Patent
Piccin

(10) Patent No.: US 11,745,671 B2
(45) Date of Patent: Sep. 5, 2023

(54) BACKLIT VEHICLE INTERIOR PANEL WITH SPECIALTY MATERIALS

(71) Applicant: Faurecia Interior Systems, Inc., Auburn Hills, MI (US)

(72) Inventor: Hugo Piccin, Cupertino, CA (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 579 days.

(21) Appl. No.: 16/832,091

(22) Filed: Mar. 27, 2020

(65) Prior Publication Data

US 2021/0300265 A1    Sep. 30, 2021

(51) Int. Cl.
| | | |
|---|---|---|
| *B60R 13/02* | (2006.01) | |
| *B32B 3/26* | (2006.01) | |
| *B32B 3/30* | (2006.01) | |
| *B32B 21/04* | (2006.01) | |
| *B32B 21/08* | (2006.01) | |
| *B32B 21/14* | (2006.01) | |
| *B29C 63/00* | (2006.01) | |
| *B60Q 3/54* | (2017.01) | |
| *B32B 7/023* | (2019.01) | |

(52) U.S. Cl.
CPC .............. *B60R 13/02* (2013.01); *B32B 7/023* (2019.01); *B60Q 3/54* (2017.02); *B32B 2605/003* (2013.01); *B60R 2013/0287* (2013.01)

(58) Field of Classification Search
CPC .. B32B 3/266; B32B 3/30; B32B 3/26; B32B 21/04; B32B 21/08; B32B 21/14; B32B 2605/003; B60R 13/02; B60R 2013/0287
See application file for complete search history.

(56) References Cited

U.S. PATENT DOCUMENTS

| 8,777,466 B2 | 7/2014 | Oeuvrard et al. |
| 2014/0177248 A1 | 6/2014 | Oeuvrard et al. |

FOREIGN PATENT DOCUMENTS

| DE | 202012100540 U1 | 2/2013 |
| DE | 102015105974 A1 | 10/2016 |
| GB | 2492100 A | 12/2012 |
| WO | 2019165441 A1 | 8/2019 |

*Primary Examiner* — Joanna Pleszczynska
(74) *Attorney, Agent, or Firm* — REISING ETHINGTON P.C.

(57) ABSTRACT

A backlit vehicle interior panel includes a non-polymeric decorative layer and a mask layer. The mask layer includes an aperture formed through a layer of opaque material. The decorative layer can be a wood layer that is part of a wood sheet complex that overlies the mask layer. A blind hole is formed in the decorative sheet complex and extends through the decorative layer. The blind hole is aligned with the aperture. Light from a light source passes through the aperture of the mask layer and the aligned blind hole of the sheet complex to partly define an illuminated symbol along at outer surface of the panel. The illuminated symbol can be generated through the decorative layer even when the decorative layer is opaque, and the symbol can have sharper features than can be produced through a translucent decorative layer.

20 Claims, 3 Drawing Sheets

BACKLIT VEHICLE INTERIOR PANEL WITH SPECIALTY MATERIALS

TECHNICAL FIELD

The present disclosure is related generally to vehicle interiors and, more particularly, to vehicle interior panels with backlighting.

BACKGROUND

Backlit panels have become ubiquitous in vehicle interiors. Vehicle status indicators such as low fuel lights, fasten seatbelt lights, and turn signal indicator lights have long been implemented in vehicle instrument panels as generally dark shapes that are inconspicuous when not illuminated but highly visible when illuminated by an underlying light source. More recently, backlit indicators have been implemented in non-traditional locations, such as along a front dash panel where backlighting shines through a decorative upholstery layer to display an image or symbol on its decorative surface while being nearly invisible when not illuminated.

In one example, U.S. Pat. No. 8,777,466 to Oeuvard et al. describes an interior panel with a backlit icon area. As with many backlit interior panels in which the illuminated symbol appears on a decorative surface, the construction relies on a décor layer made from a translucent material to allow the backlighting to penetrate the panel.

SUMMARY

An illustrative vehicle interior panel includes an outer surface, a mask layer, a decorative sheet complex, and a blind hole. The mask layer underlies the outer surface and has an aperture formed therethrough. The decorative sheet complex is arranged between the mask layer and the outer surface and includes a non-polymeric decorative layer. The blind hole is formed in the decorative sheet complex, extends through the decorative layer, and is aligned with the aperture. The panel is configured to display an illuminated symbol along the outer surface when light is provided at an inner side of the mask layer. The aperture and blind hole are aligned with the illuminated symbol.

In various embodiment, the non-polymeric decorative layer is a wood layer.

In various embodiments, the decorative layer is opaque.

In various embodiments, the blind hole is one of a plurality of discrete blind holes formed through the decorative layer. The plurality of blind holes is arranged in a two-dimensional pattern along the decorative sheet complex to partly define a shape of the illuminated symbol.

In various embodiments, each of a plurality of blind holes is aligned with the aperture.

In various embodiments, the aperture is one of a plurality of discrete apertures of the mask layer. The plurality of apertures is arranged in a two-dimensional pattern along the mask layer such that each one of the blind holes is aligned with a different one of the apertures.

In various embodiments, the panel includes a topcoat configured to diffuse light passing from the blind hole through the topcoat to the outer surface.

In various embodiments, the decorative sheet complex includes at least one layer different from the decorative layer disposed between the decorative layer and the mask layer such that the blind hole ends in said different layer.

In various embodiments, a method of making the vehicle interior panel includes the steps of forming the mask layer on a substrate, disposing the decorative sheet complex over the mask layer, and forming the blind hole in the decorative sheet complex after the step of disposing.

In various embodiments, the step of forming the blind hole is performed using a laser.

In various embodiments, the step of forming the mask layer includes the step of forming the aperture of the mask layer using the same laser.

In various embodiments, the substrate includes a positioner used to define a common reference position of the substrate during the step of forming the blind hole and the step of forming the aperture.

In various embodiments, the decorative sheet complex is provided as a pre-laminated component comprising the decorative layer bonded to a thermoplastic sheet that is at least partially transparent.

In various embodiments, a vehicle interior panel assembly includes the vehicle interior panel and a light source located along an inner side of the vehicle interior panel and configured to provide the light at the inner side of the mask layer.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a backlit vehicle interior panel that includes a non-polymeric decorative layer. The panel is constructed so that an illuminated symbol appears along the panel when backlit with no visible indication of the location of the illuminated symbol when not backlit. Non-polymeric decorative layers such as wood, mineral, metal, carbon, etc. present special backlighting problems. For one, the thickness and/or color of the layer can make it generally opaque to visible light, for example when a wood layer is stained a desirable color such as deep mahogany or ebony. Even natural or lightly stained wood presents backlighting problems. For example, when wood or other non-polymeric materials are made sufficiently thin to have a translucent character, it is difficult to produce a sharp graphic image along the outer surface due to light scattering within the thickness of the layer. Also, with naturally produced decorative layers such as wood, the appearance is impossible to predict from one panel to another. For instance, a dark grain line in a layer of wood or an inclusion in a mineral layer may inadvertently obscure the backlighting in a manner that affects the appearance of the intended symbol or graphic, such as rendering the symbol ambiguous and/or incomprehensible.

Figure 1:
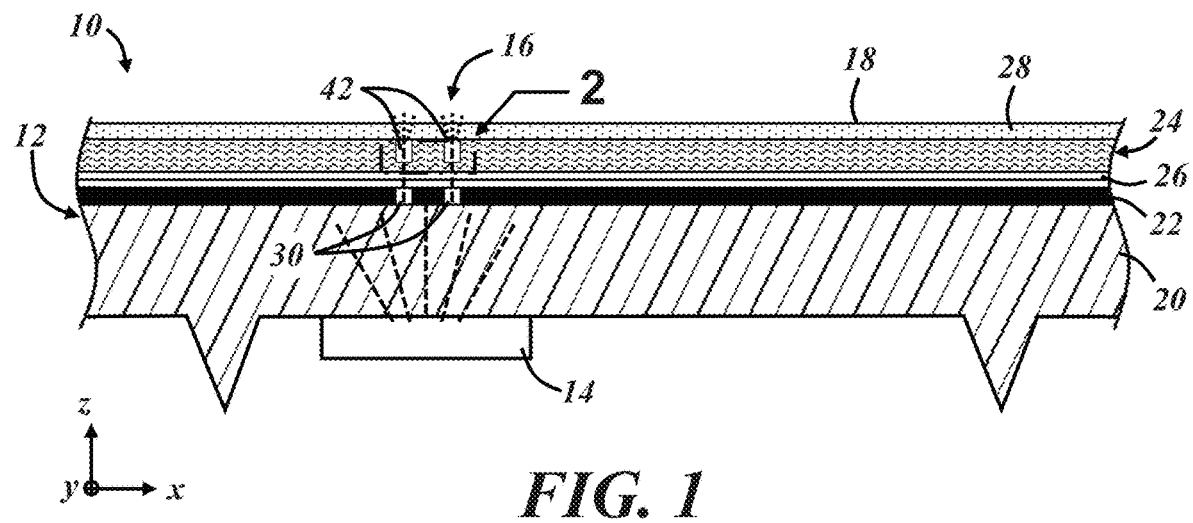
FIG. 1 is a cross-sectional view of a portion of a vehicle interior panel assembly having an outer surface along which an illuminated symbol is formed.

FIG. 1 is a cross-sectional view of a portion of a vehicle interior panel assembly 10, including a vehicle interior panel 12 and a light source 14 along an inner side of the panel 12. The light source 14 can be of any variety, such as an LED, fiber optic, or other suitable source, and may be controlled by a panel controller, an interior system controller, a vehicle controller, a switch, or other suitable controller. When the light source 14 is activated, an illuminated symbol 16 appears along an outer surface 18 of the panel 12. The symbol 16 may be or may include an alphanumeric character, a geometric shape, an icon, or any other non-random pattern intended to visually communicate information to a user. As used herein, "outer" refers to a surface or side facing toward an interior of a passenger cabin of a vehicle when the panel is installed in the vehicle, and "inner" refers to a surface or side facing away from the interior of the passenger cabin when the panel is installed in the vehicle.

The illustrated panel 12 includes a substrate 20, a mask layer 22 over the substrate, and a decorative sheet complex 24 over the mask layer. One or more adhesive layers 26 may bond the decorative sheet complex 24 to the underlying layers and a topcoat 28 may be disposed over the decorative sheet complex. Each layer may itself include multiple layers, additional layers may be included, or certain layers may be omitted. It should be noted that the figures are not necessarily to scale. For example, certain layer thicknesses or features may be exaggerated for purposes of illustration.

The mask layer 22 is a layer of opaque material with one or more apertures 30 formed entirely through its thickness. The mask layer 22 blocks light from the light source 14 except at the apertures 30. Stated differently, the mask layer 22 selectively permits light from the light source 14 to pass to and/or through the decorative sheet complex 24 to eventually reach the outer surface 18 of the panel 12 in a desired two-dimensional pattern. The apertures 30 partly define the shape of the illuminated symbol 16 displayed along the outer surface 18 of the panel via their arrangement along a plane or contour in which the mask layer 22 extends—which is an x-y plane in this example. Each aperture 30 is aligned with the illuminated symbol 16 in a direction normal to the outer surface 18 (i.e., the z-direction of FIG. 1). The opaque material of the mask layer need not have a 100% light-blocking character and may be only sufficiently opaque to serve its purpose of defining locations along the panel at which the illuminated symbol 16 will be apparent. The opaque material may permit 50% or less, 75% or less, 90% or less, or 95% or less of visible light to pass through the mask layer at non-aperture locations.

The decorative sheet complex 24 is a multilayer composite material comprising a non-polymeric decorative layer 32 and at least one additional layer of a different material bonded together with the decorative layer. A portion of an illustrative decorative sheet complex 24 is illustrated in cross-section in FIG. 2. This example includes a backing layer 34, adhesive layers 36 bonding the decorative layer 32 to the backing layer 34, and a primer layer 38 to facilitate adhesion of the topcoat 28 of the finished panel 12. One or more colorant layers 40 (e.g., stain) may be included at the outer side of the decorative layer 32 and may be at least partly diffused into the decorative layer.

The non-polymeric decorative layer 32 is a layer that is visible when viewing the outer surface 18 of the panel assembly 10. In the following examples, the decorative layer 32 may be referred to as a wood layer for purposes of illustration. However, as used herein, the non-polymeric decorative layer 32 is intended to refer to any non-polymeric layer, such as a layer formed from mineral, metal, ceramic, carbon fiber or other carbon sheet products, or lignocellulosic materials other than traditional wood.

Figure 2:
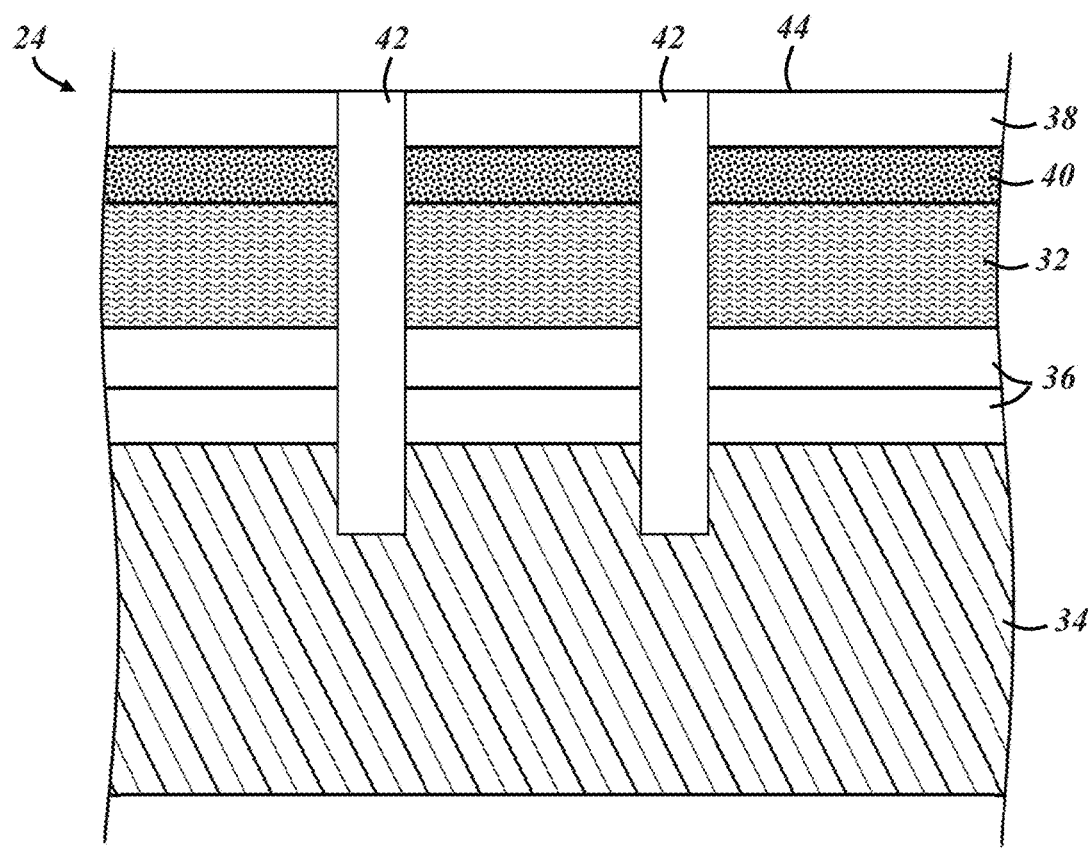
FIG. 2 is an enlarged view of a portion of a decorative sheet complex of the panel assembly of FIG. 1.

The illustrated panel 12 includes one or more blind holes 42 formed in the sheet complex 24. Each blind hole 42 extends entirely through the thickness of the decorative layer 32 and ends within one of the other layers of the complex 24. In the example of FIG. 2, each blind hole 42 opens along an outer surface 44 of the decorative sheet complex 24, extends through the primer layer 38, the colorant layer 40, the decorative layer 32, and the adhesive layers 36, ending in the backing layer 34. As illustrated in FIG. 1, each blind hole 42 is aligned with one of the apertures 30 of the mask layer 22. Each blind hole 42 is thus also aligned with the illuminated symbol 16 in a direction normal to the outer surface 18 (i.e., the z-direction of FIG. 1). As such, even though the decorative layer 32 is constructed essentially the same as the mask layer 22—i.e., with apertures or holes extending entirely through the respective layer and aligned at the same x-y locations—the decorative layer 32 does not serve the same function as the mask layer 22 because the light has already been masked by the time it reaches the decorative layer 32. The blind holes 42 of the sheet complex 24 are aligned with the apertures 30 of the mask layer 22, but they are not continuous with each other and thus cannot be formed in the same manufacturing operation.

The sheet complex 24 may be provided as a pre-laminated sheet material made up primarily of a thin veneer as the decorative layer 32 adhered to a clear plastic film as the backing layer 34. With continued reference to FIG. 2, the backing layer 34 is at least partially transparent and preferably a transparent thermoplastic material such as poly(methyl methacrylate) or other acrylic polymer. The backing layer 34 may be the thickest layer of the sheet complex 24 and can provide mechanical structure and formability to the sheet complex. For example, while the decorative layer 32 may be sufficiently thin so as to be flexible, the backing layer 34 can be plastically deformed when heated and held in the desired shape until cooled to give the sheet complex 24 the desired overall shape. The backing layer 32 may for example have a thickness in a range from 0.5 to 1.0 mm, though other thicknesses are possible.

The adhesive layers 36 bonding the decorative layer 32 to the backing layer 34 may have a thickness in a range from 15 μm to 60 μm in total. In embodiments such as FIG. 2 in which the blind holes 42 pass entirely through the adhesive layers 36, there is no need for optical clarity so the selection of adhesive type is not limited to transparent or translucent materials. One suitable adhesive type for the adhesive layers 36 is a poly(vinyl acetate) adhesive, which is particularly useful to bond cellulosic materials when used as the decorative layer 32.

In some embodiments, the decorative layer 32 is a thin sheet of solid natural wood. One suitable thickness range for such a layer 32 is a range from 0.2 mm to 0.4 mm. The non-polymeric decorative layer 32 is the primary provider of the aesthetic appearance of the panel 12, which is to say that there is some desire among consumers to have naturally occurring wood grain or other exotic patterns as a decorative element in vehicle interiors, and this desirable appearance is provided by the decorative layer 32 of the panel 12 and may be enhanced by the colorant layer 40 and other overlying layers. One advantage of the embodiment of FIGS. 1 and 2 is that the thickness of the decorative layer 32 and the color of the colorant layer 40 are not limited by optical properties of their respective materials. For example, a wood decorative layer 32 can be made entirely opaque because the backlighting passes through the holes 42 in the decorative layer. This means that very dark-stained woods can be used—i.e., the décor layer of the panel 12 does not have to be translucent. This also means that relatively thick wood layers can now be used if desired.

Figure 3A:
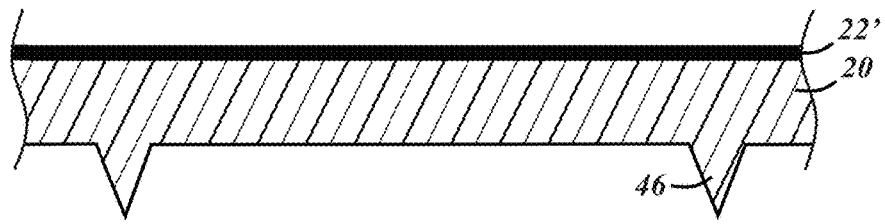
FIGS. 3A-3E depict steps of a method of making a vehicle interior panel of the assembly of FIG. 1.

An exemplary method of making the panel 12 of FIG. 1 is described below with reference to FIGS. 3A-3E. FIG. 3A illustrates the panel substrate 20 after a step of coating with the layer of opaque material 22' used to subsequently form the mask layer 22. The substrate 20 is the physical support layer of the panel and is at least partly transparent to visible light. Light transmission properties must be balanced with structural properties, some of which depend on the overall size of the panel and on its expected performance. While a perfectly transparent substrate 20 may be desirable, materials such as sheet glass, acrylic, and polycarbonate cannot typically meet the physical performance requirements of a vehicle interior panel, which can be very large (e.g., an instrument panel), must endure severe temperature extremes without changing shape, and must not exhibit brittle fractures in vehicle collision scenarios.

In one embodiment, the substrate 20 is a molded component formed from a translucent glass-fiber reinforced thermoplastic material in which the majority component is a transparent resin such as polycarbonate or acrylic. One suitable substrate material is a glass-fiber reinforced polycarbonate/ABS (PC/ABS) alloy. The glass fibers may be present in an amount between 10-30 wt % or approximately 20 wt %. In applications in which the panel 12 is relatively small and/or vertically oriented, the reinforcing fibers may be omitted to improve the clarity of the substrate 20. In some embodiments, the panel 12 is a relatively small subpanel of a larger interior panel, in which case, an unreinforced plastic material can be used for the substrate 20. For example, the panel assembly 10 or panel 12 of FIG. 1 could be made for insertion into the outer side of a larger instrument panel, with the main body of the instrument panel being made from a reinforced plastic material without the requirement of optical clarity.

The substrate 20 includes reference positioners 46 used to position and fixture the substrate 20 and any attached layers or components in a repeatable location during subsequent manufacturing steps, as discussed further below. The conical or triangular cross-sectional shapes of FIG. 3A are but one example of suitable positioners 46.

In addition to its light-blocking function, the opaque material layer 22' may be formulated as a primer coat to improve adhesion with the subsequently applied layers. In one embodiment, the layer of opaque material 22' has a thickness ranging from 15 to 40 μm, but other thicknesses outside that range are possible. A polyurethane-based coating may be suitable for use as the opaque layer 22'.

Figure 3B:
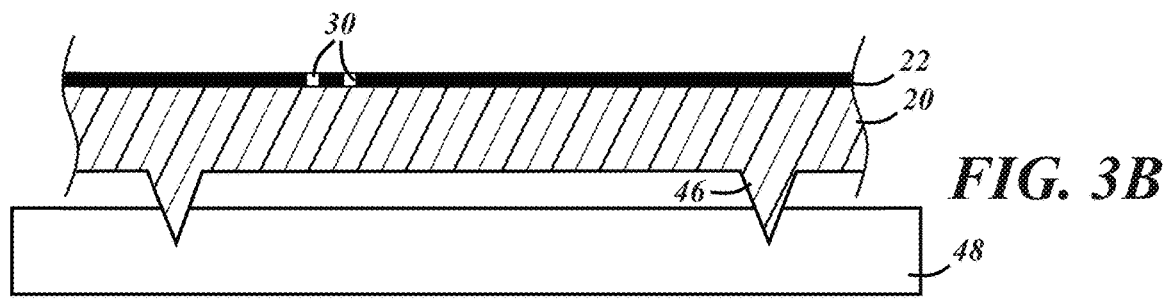

FIG. 3B illustrates the mask layer 22 after the apertures 30 are formed in the layer of opaque material. The apertures 30 are formed in a pattern that lies within the projected area of the desired illuminated symbol 16. Each aperture 30 is formed entirely through the layer of opaque material. In one embodiment, a diameter or width of each aperture is in a range from 10 μm to 70 μm, but other dimensions outside that range are possible. The apertures can be formed via laser or any other suitable means of selective removal of the layer of opaque material. In one embodiment, an ultraviolet laser is used to form the apertures 30 in the desired pattern along the layer of opaque material to form the mask layer 22. In a particular embodiment, a 3W hybrid fiber optic/WVO$_4$ crystal oscillator laser is used to form the apertures 30.

As indicated in FIG. 3B, the coated substrate 20 is secured in a fixture 48 with the positioners 46 positively locating the substrate at a reference position relative to the fixture. The pattern of apertures 30 is made in relation to this reference position. Other manners of forming the apertures 30 are possible, such as chemical, photoresistive, mechanical, electromechanical, or other non-laser material removal techniques. In other embodiments, the mask layer 22 is made in an additive process such as screen or inkjet printing on the outer surface of the substrate 20 with the apertures formed where the ink is omitted in the printed pattern.

In another embodiment, the mask layer 22 is formed by insert molding or over-molding an opaque layer over the substrate with the apertures 30 being formed in the over-molding operation (e.g., a two-shot molding). In yet another embodiment, the substrate 20 and the mask layer 22 are combined into a single molded component. For example, the substrate 20 could be formed from an opaque material with the apertures 30 formed therethrough either in the molding operation or in a subsequent operation, such as a laser operation similar to the above-described laser aperture-forming operation.

Figure 3C:
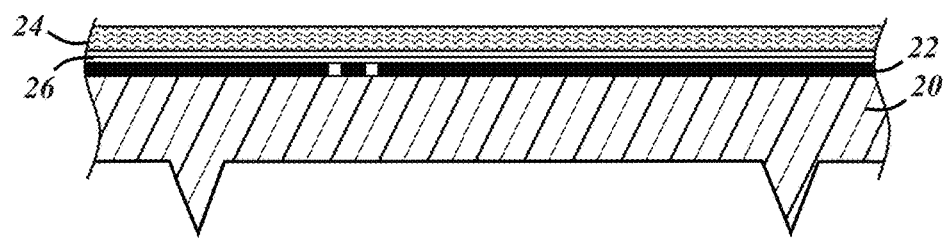

FIG. 3C illustrates the sheet complex 24 after attachment over the substrate 20 and mask layer 22. In this example, adhesive layers 26 are used to bond the sheet complex 24 to the mask layer 22. One adhesive layer 26 can be applied to each of the opposing surfaces, one or more adhesive layers can be applied to the outer surface of the mask layer 22, or one or more adhesive layers can be applied to the inner surface of the sheet complex 24. In one embodiment, the adhesive of the layers 26 is semi-transparent or translucent. No apertures are formed in the adhesive layers 26 in this example. The total thickness of the adhesive layers 26 may be in a range from 15 μm to 60 μm. In one particular embodiment, the adhesive layers 26 are formed from a waterborne two-part polyurethane material that is semi-transparent when cured. Use of the positioners 46 is not required during attachment of the wood sheet complex 24 in the illustrated example, as the blind holes 42 have not yet been formed.

Figure 3D:
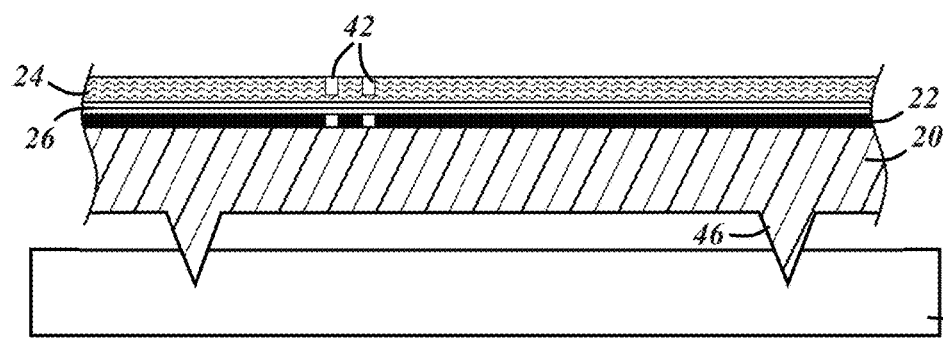

FIG. 3D illustrates the sheet complex 24 after the blind holes 42 are formed therein. The blind holes 42 extend completely through the decorative layer 32 and are aligned with the apertures 30 of the underlying mask layer 22. In embodiments in which the apertures of the mask layer 22 are arranged in a particular two-dimensional pattern, the aligned blind holes are thus formed in the same two-dimensional pattern within the projected area of the same desired illuminated symbol 16. A diameter or width of each blind hole 42 may be in a range from 10 μm to 30 μm or up to 50 μm, but other dimensions are possible. The blind holes 42 can be formed via laser or any other suitable means of selective removal of the layer of opaque material. In one embodiment, an ultraviolet laser is used to form the apertures blind holes 42 in the desired pattern along the sheet complex 24. In a particular embodiment, a 3W hybrid fiber optic/WVO$_4$ crystal oscillator laser is used to form the blind holes 42.

It is thus possible to form the blind holes 42 in the sheet complex 24 using the same laser as that used to form the apertures 30 in the mask layer 22. Indeed, as indicated in FIG. 3D, the assembled substrate 20, mask layer 22, and sheet complex 24 can be secured in the same fixture 48 used when forming the apertures 30 of the mask layer 22 with the positioners 46 positively locating the substrate at the same reference position relative to the fixture. The blind holes 42 can be made in the same pattern as the apertures 30 of the mask layer in relation to this reference position.

Figure 3E:
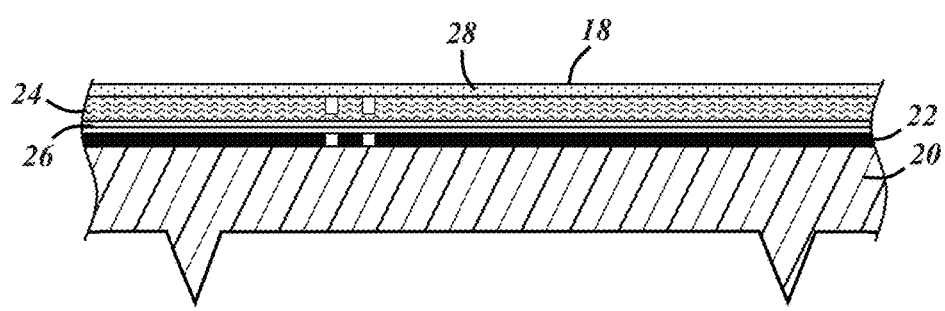

FIG. 3E shows the topcoat 28 applied over the sheet complex 24. The topcoat 28 may be considered a protective layer to help block ultraviolet light from sunlight during use. The topcoat 28 is at least partially transparent so that the light passing through the apertures 30 and holes 42 of the panel 12 from the light source 14 can be perceived at the outer surface 18 of the panel. Preferably, the topcoat 28 is translucent such that light passing through the topcoat is partly diffused. The diffusion of light passing through the topcoat 28 can have two desirable effects. First, when the patterns of the masking apertures 30 and blind holes 42 are formed as a grouping of spaced apart openings in their respective layers, diffusion of the light through the topcoat 28 can give the appearance that those light-providing openings are very close together or touching such that the illuminated symbol appears continuous rather than as a series of holes. Second, light passing through the topcoat 28 from the outer side of the panel (e.g., vehicle interior lighting or sunlight) is twice diffused when reflected from the sheet complex and perceived by an observer. This can have a camouflaging effect on the holes 42 in the wood layer 32 such that the presence of the pattern of holes that form the illuminated symbol when backlit are virtually undetectable by the observer when not backlit.

Figure 4:
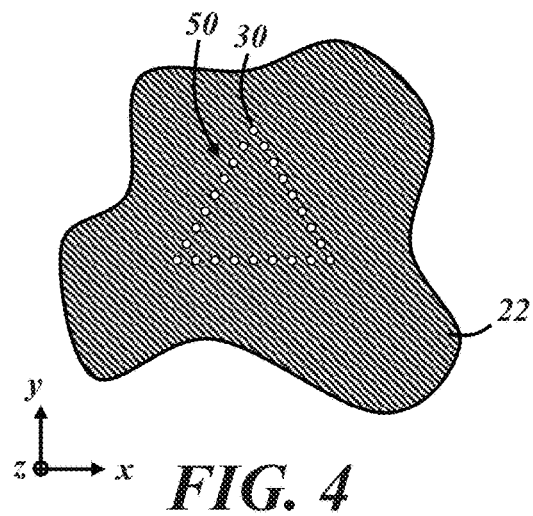
FIG. 4 is a plan view of a portion of an outer surface of a mask layer of the panel.

FIGS. 4-7 are plan views of a portion of the outer surfaces of various layers during the exemplary method of FIGS. 3A-3E. FIG. 4 corresponds to FIG. 3B and is a view of a portion of the outer surface of the mask layer 22 with a plurality of apertures 30 formed through the layer of opaque material. The apertures 30 are discrete and arranged in a discernible pattern 50, which is triangular in this example. The spacing between adjacent apertures 30 of the pattern 50 may be in a rage from 0.4 mm to 0.6 mm.

Figure 5:
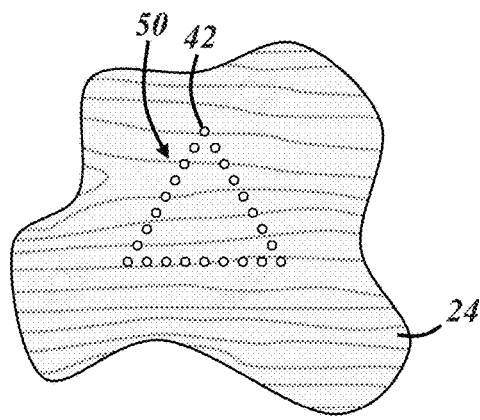
FIG. 5 is a plan view of a portion of an outer surface of the decorative sheet complex after formation of blind holes, wherein the decorative layer is a wood layer.

FIG. 5 corresponds to FIG. 3D and is a view of the outer surface of the sheet complex 24 with a plurality of blind holes apertures 42 formed through a wood layer but not entirely through the sheet complex. The holes 42 are arranged in the same discernible pattern 50 as the underlying apertures with the same spacing between adjacent apertures holes 42 of the pattern 50.

Figure 6:
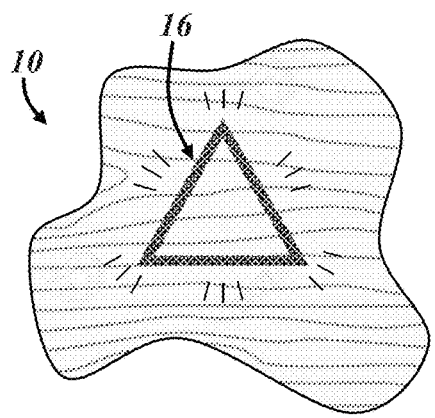
FIG. 6 is a plan view of a portion of the outer surface of the panel assembly depicting the illuminated symbol, wherein the decorative layer is a wood layer.
Figure 7:
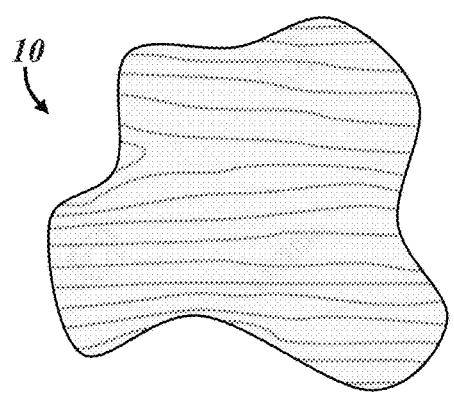
FIG. 7 is a plan view of a portion of the outer surface of the panel assembly of FIG. 6 with the light source deactivated.

FIG. 6 is a view of the outer surface 18 of the finished panel assembly 10 with the underlying light source activated to produce the illuminated symbol 16, which in this case is a triangle. The diffusing topcoat 28 layer helps the discrete circles of light coming through the sheet complex to appear as a continuous line in the illuminated symbol 16. And as depicted in FIG. 7, the pattern of holes and apertures in the underlying layers of the panel are virtually invisible to an observer, due to the combination of the relatively small size of the blind holes 42, the spacing between holes, and the diffusing topcoat.

Figure 8:
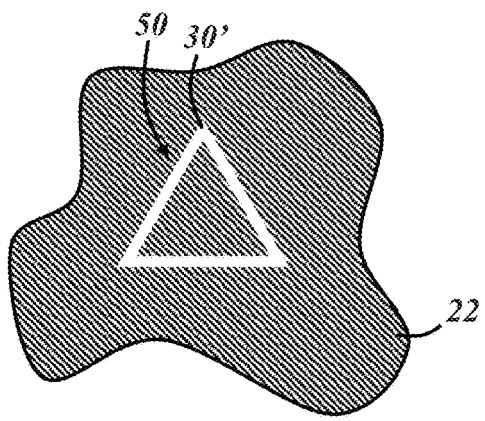
FIG. 8 is a plan view of a portion of the outer surface of the mask layer of another embodiment of the panel.

In another embodiment, the apertures of the mask layer 22 may not be identical in number and/or in the form of the pattern. For example, another manner of making the panel to display the triangular illuminated symbol of FIG. 6 is to form a single triangular aperture 30' in the mask layer 22 as in FIG. 8. The blind holes of the sheet complex are formed discretely along the projected area of the mask aperture 30' to achieve a similar effect. The aperture 30' of the mask layer 22 is considered to be aligned with the blind holes in this embodiment as well.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior panel, comprising:
   an outer surface;
   a mask layer underlying the outer surface and having an aperture formed therethrough;
   a decorative sheet complex arranged between the mask layer and the outer surface, the decorative sheet complex comprising a non-polymeric decorative layer; and
   a blind hole formed in the decorative sheet complex, wherein the blind hole extends through the decorative layer and is aligned with the aperture,
   wherein the panel is configured to display an illuminated symbol along the outer surface when light is provided at an inner side of the mask layer, the aperture and blind hole being aligned with the illuminated symbol, and
   wherein the decorative sheet complex comprises an additional layer different from the decorative layer disposed between the decorative layer and the mask layer such that the blind hole ends within a thickness of the additional layer.

2. The vehicle interior panel of claim 1, wherein the decorative layer is a wood layer.

3. The vehicle interior panel of claim 1, wherein the decorative layer is opaque.

4. The vehicle interior panel of claim 1, wherein the blind hole is one of a plurality of discrete blind holes formed through the decorative layer, the plurality of blind holes being arranged in a two-dimensional pattern along the decorative sheet complex, the two-dimensional pattern at least partly defining a shape of the illuminated symbol.

5. The vehicle interior panel of claim 4, wherein each of the plurality of blind holes is aligned with the aperture.

6. The vehicle interior panel of claim 4, wherein the aperture is one of a plurality of discrete apertures of the mask layer, the plurality of apertures being arranged in said two-dimensional pattern along the mask layer such that each one of the blind holes is aligned with a different aperture of the plurality of apertures.

7. The vehicle interior panel of claim 1, further comprising a topcoat configured to diffuse light passing from the blind hole through the topcoat to the outer surface.

8. The vehicle interior panel of claim 1, wherein the blind hole opens along an outer surface of the decorative sheet complex.

9. The vehicle interior panel of claim 1, wherein the additional layer is a backing layer and the decorative sheet complex further comprises an adhesive layer bonding the backing layer to the decorative layer, wherein the blind hole extends through the decorative layer and the adhesive layer and ends within the thickness of the backing layer.

10. The vehicle interior panel of claim 9, wherein the adhesive layer is opaque.

11. The vehicle interior panel of claim 1, wherein the blind hole has a width in a range from 10 μm to 50 μm.

12. The vehicle interior panel of claim 1, wherein the blind hole has a width in a range from 10 μm to 30 μm.

13. The vehicle interior panel of claim 1, wherein the aperture has a width in a range from 10 μm to 70 μm.

14. The vehicle interior panel of claim 1, wherein the aperture is one of a plurality of apertures and the blind hole is one of a plurality of blind holes, a spacing between adjacent apertures and adjacent blind holes being in a range from 0.4 mm to 0.6 mm.

15. A vehicle interior panel assembly comprising the vehicle interior panel of claim 1 and a light source located along an inner side of the vehicle interior panel and configured to provide said light.

16. A method of making the vehicle interior panel of claim 1, comprising the steps of:
forming the mask layer on a substrate;
disposing the decorative sheet complex over the mask layer; and
forming the blind hole in the decorative sheet complex after the step of disposing.

17. The method of claim 16, wherein the step of forming the blind hole is performed using a laser.

18. The method of claim 17, wherein the step of forming the mask layer comprises the step of forming the aperture of the mask layer using the same laser.

19. The method of claim 18, wherein the substrate comprises a positioner used to define a common reference position of the substrate during the step of forming the blind hole and the step of forming the aperture.

20. The method of claim 16, wherein the decorative sheet complex is provided as a pre-laminated component comprising the decorative layer bonded to a thermoplastic sheet that is at least partially transparent.

\* \* \* \* \*